US010154268B2

United States Patent
Chen et al.

(10) Patent No.: US 10,154,268 B2
(45) Date of Patent: *Dec. 11, 2018

(54) METHOD OF CROSS COLOR INTRA PREDICTION

(71) Applicant: MEDIATEK INC., Hsin-Chu (TW)

(72) Inventors: Ching-Yeh Chen, Taipei (TW); Chih-Wei Hsu, Taipei (TW); Chia-Yang Tsai, Zhubei (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,481

(22) Filed: Jun. 26, 2017

(65) Prior Publication Data

US 2017/0295366 A1 Oct. 12, 2017

Related U.S. Application Data

(63) Continuation of application No. 14/655,447, filed as application No. PCT/CN2014/073395 on Mar. 13, 2014, now Pat. No. 9,736,487.

(Continued)

(51) Int. Cl.
*H04N 19/11* (2014.01)
*H04N 19/00* (2014.01)
(Continued)

(52) U.S. Cl.
CPC ........... *H04N 19/186* (2014.11); *H04N 19/11* (2014.11); *H04N 19/159* (2014.11);
(Continued)

(58) Field of Classification Search
None
See application file for complete search history.

(56) References Cited

U.S. PATENT DOCUMENTS 10,021,384 B2 * 7/2018 Seregin .................. H04N 19/46
2011/0249731 A1 10/2011 Zhao et al.
(Continued)

FOREIGN PATENT DOCUMENTS

WO WO 2007/108642 9/2007
WO WO 2012/175003 12/2012

OTHER PUBLICATIONS

Zhang et al., "New Chroma Intra Prediction Modes Based in Linear Model for HEVC", 19th IEEE International Conference on Image Processing (ICIP), Sep.30-Oct. 3, 2012, pp. 197-200.

(Continued)

*Primary Examiner* — Reza Aghevli
(74) *Attorney, Agent, or Firm* — McClure, Qualey & Rodack. LLP

(57) ABSTRACT

In one implementation, a method operates by receiving neighboring reconstructed first-color pixels and current reconstructed first-color pixels of a current first-color block and receiving neighboring reconstructed second-color pixels of a current second-color block collocated with the current first-color block. The method then determines linear model (LM) parameters according to a linear model for one or more LM Intra modes. The method then receives input data associated with current second-color pixels of the current second-color block and generates a cross-color Intra predictor from the current reconstructed first-color pixels of the current first-color block using the LM parameters associated with a LM Intra mode selected from said one or more LM Intra modes. Finally, the method applies cross-color Intra prediction encoding or decoding to the current second-color pixels of the current second-color block using the cross-color Intra predictor for the selected LM Intra mode.

17 Claims, 8 Drawing Sheets

Related U.S. Application Data

(60) Provisional application No. 61/805,310, filed on Mar. 26, 2013.

(51) Int. Cl.
   *H04N 19/59* (2014.01)
   *H04N 19/593* (2014.01)
   *H04N 19/186* (2014.01)
   *H04N 19/182* (2014.01)
   *H04N 19/597* (2014.01)
   *H04N 19/159* (2014.01)
   *H04N 19/82* (2014.01)

(52) U.S. Cl.
   CPC .......... *H04N 19/182* (2014.11); *H04N 19/59* (2014.11); *H04N 19/593* (2014.11); *H04N 19/597* (2014.11); *H04N 19/82* (2014.11)

(56) References Cited

U.S. PATENT DOCUMENTS

| | | | |
|---|---|---|---|
| 2012/0287995 A1 | 11/2012 | Budagavi | |
| 2012/0328013 A1 | 12/2012 | Budagavi et al. | |
| 2013/0114696 A1* | 5/2013 | Liu | H04N 19/176 375/240.03 |
| 2013/0128966 A1* | 5/2013 | Gao | H04N 19/176 375/240.12 |
| 2013/0188696 A1* | 7/2013 | Liu | H04N 19/593 375/240.12 |
| 2013/0188702 A1* | 7/2013 | Li | H04N 19/50 375/240.12 |
| 2013/0188703 A1* | 7/2013 | Liu | H04N 19/503 375/240.12 |
| 2013/0188705 A1* | 7/2013 | Liu | H04N 19/50 375/240.12 |
| 2013/0251028 A1* | 9/2013 | Au | H04N 19/00018 375/240.02 |
| 2013/0272396 A1* | 10/2013 | Liu | H04N 19/50 375/240.12 |
| 2014/0086323 A1* | 3/2014 | Chuang | H04N 19/159 375/240.12 |
| 2014/0086502 A1* | 3/2014 | Guo | H04N 19/105 382/238 |
| 2014/0098859 A1* | 4/2014 | Lim | H04N 19/13 375/240.12 |
| 2014/0098862 A1 | 4/2014 | Yang et al. | |
| 2014/0348247 A1* | 11/2014 | Tsukuba | H04N 19/91 375/240.26 |
| 2014/0355667 A1* | 12/2014 | Lei | H04N 19/105 375/240.02 |
| 2015/0003524 A1* | 1/2015 | Yamamoto | H04N 19/587 375/240.12 |
| 2015/0016516 A1* | 1/2015 | Saxena | H04N 19/105 375/240.12 |
| 2015/0016522 A1* | 1/2015 | Sato | H04N 19/30 375/240.12 |
| 2015/0036744 A1* | 2/2015 | Sato | H04N 19/593 375/240.12 |
| 2015/0036745 A1* | 2/2015 | Hsu | H04N 19/593 375/240.12 |
| 2015/0043639 A1* | 2/2015 | Lee | H04N 19/61 375/240.12 |
| 2015/0063438 A1 | 3/2015 | Kim et al. | |
| 2016/0119639 A1* | 4/2016 | Sato | H04N 19/52 382/238 |

OTHER PUBLICATIONS

Cho et al., "New Intra Luma Prediction Mode in H264/AVC Using Collocated Weighted Chroma Pixel Value", J. Blanc-Talon et al. (Eds.): ACIVS 2006, LNCS 4179, Springer-Verlag, Berlin, Heidelbery, 2006, pp. 344-353.

International Search Report dated Jun. 10, 2014, issued in application No. PCT/CN2014/073395.

* cited by examiner

METHOD OF CROSS COLOR INTRA PREDICTION

CROSS REFERENCE TO RELATED APPLICATIONS

The present application is a continuation of U.S. patent application Ser. No. 14/655,447, filed Jun. 25, 2015, which was a National Stage Application of PCT Patent Application No. PCT/CN2014/073395, filed on Mar. 13, 2014, which claimed priority to U.S. Provisional Patent Application Ser. No. 61/805,310, filed on Mar. 26, 2013, entitled "Improved Chroma LM Mode". The U.S. Provisional Patent Application is hereby incorporated by reference in its entirety.

TECHNICAL FIELD

The present invention relates to video coding. In particular, the present invention relates to coding techniques associated with Intra prediction using inter-color linear mode based on reconstructed pixels of another color.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, Intra coding is required to compress the regions with high motion or scene changes. Besides, Intra coding is also used to process an initial picture or to periodically insert I-pictures or I-blocks for random access or for alleviation of error propagation. Intra prediction exploits the spatial correlation within a picture or within a picture region. In practice, a picture or a picture region is divided into blocks and the Intra prediction is performed on a block basis. Intra prediction for a current block can rely on pixels in neighboring blocks that have been processed. For example, if blocks in a picture or picture region are processed row by row first from left to right and then from top to bottom, neighboring blocks on the top and neighboring blocks on the left of the current block can be used to form Intra prediction for pixels in the current block. While any pixels in the processed neighboring blocks can be used for Intra predictor of pixels in the current block, very often only pixels of the neighboring blocks that are adjacent to the current block boundaries on the top and on the left are used.

The Intra predictor is usually designed to exploit spatial features in the picture such as smooth area (DC mode), vertical line or edge, horizontal line or edge and diagonal line or edge. Furthermore, spatial correlation often exists between the luminance (luma) and chrominance (chroma) components. Therefore, reconstructed luma pixels can be used to derive the Intra chroma prediction. In the emerging High Efficiency Video Coding (HEVC), a chroma Intra prediction mode based on the reconstructed luminance signal has been considered. This type of chroma Intra prediction is termed as Linear Model (LM) prediction. FIG. 1 illustrates the Intra prediction derivation for LM mode. First, the neighboring reconstructed pixels (indicated by circles) of a collocated luma block (i.e., Y block) and the neighboring reconstructed pixels (indicated by circles) of a chroma block (i.e., U or V block) in FIG. 1 are used to derive the linear model parameters between the blocks. The predicted pixels of the chroma block are generated using the parameters and the reconstructed pixels of the luma block. In the parameters derivation, the top reconstructed pixel row adjacent to the top block boundary of the current luma block and the left reconstructed pixel column adjacent to the left block boundary of the current luma block are used. It is noted that the second left reconstructed pixel column from the left boundary is used instead of the left column immediately adjacent to the left boundary in order to match the sampling locations of the chroma pixels. The specific row and column of the luma block are used in order to match the 4:2:0 sampling format of the chroma components. While FIG. 1 illustrates the example of LM chroma mode for the 4:2:0 sampling format, the LM chroma mode for other chroma sampling format may also derived similarly.

According to the LM prediction mode, the chroma values are predicted from reconstructed luma values of a collocated block. The chroma components may have lower spatial resolution than the luma component. In order to use the luma signal for chroma Intra prediction, the resolution of the luma signal may have to be reduced to match with that of the chroma components. For example, for the 4:2:0 sampling format, the U and V components only have half of the number of samples in vertical and horizontal directions as the luma component. Therefore, 2:1 resolution reduction in vertical and horizontal directions has to be applied to the reconstructed luma samples. The resolution reduction can be achieved by down-sampling process or sub-sampling process.

In LM chroma mode, for a to-be-predicted chroma sample V with its collocated reconstructed luma sample $V_{col}$, the linear model to generate LM predictor P is formulated as follows:

$$P = a \cdot V_{col} + b$$

In the above equation, a and b are referred as LM parameters. The LM parameters can be derived from the neighboring reconstructed luma and chroma samples around the current block so that the parameters do not need to be coded in the bitstream. After deriving the LM parameters, chroma predictors can be generated from the collocated reconstructed luma samples in the current block according to the linear model. For example, if the video format is YUV420, then there are one 8×8 luma block and two 4×4 chroma blocks for each 8×8 coding unit, as shown in FIG. 1., In FIG. 1, each small square corresponds to one pixel in the current coding unit (2N×2N for luma and N×N for chroma) to be coded. The LM parameters are derived first based on neighboring reconstructed samples of the current coding unit, which are represented as circles in FIG. 1. Due to the YUV420 sampling format, the collocated chroma position is located between two corresponding vertical luma samples. An average value between two corresponding vertical luma samples is used to derive the LM parameters. For neighboring pixels above the top block boundary, the average value is replaced by the closest sample in the vertical direction in order to reduce the line buffer requirement. The neighboring pixels (as shown in circles) of the currently luma (Y) and chroma (U or V) coding units are used to derive the LM parameters for the respective chroma component as shown in FIG. 1. After the LM parameters are derived, the chroma predictors are generated based on the linear model and the collocated luma reconstructed samples. According to the video format, an average luma value may be used instead of the corresponding luma sample.

A method of chroma Intra prediction using extended neighboring pixels for LM parameter derivation has been disclosed by Zhang et al., ("New Modes for Chroma Intra Prediction", in Joint Collaborative Team on Video Coding (JCT-VC) of ITU-T SG16 WP3 and ISO/IEC JTC1/SC29/

WG11, 7th Meeting: Geneva, CH, 21-30 Nov., 2011, document: JCTVC-G358). FIG. 2A-FIG. 2C illustrate an example of chroma Intra prediction for 8×8 chroma block using extended neighboring pixels according to Zhang. FIG. 2A corresponds to regular chroma Intra prediction being considered by HEVC. FIG. 2B illustrates the example of LM parameter derivation based for an additional chroma Intra mode using extended horizontal neighboring pixels, where additional N pixels from the upper-right neighbor are used. FIG. 2C illustrates the example of LM parameter derivation based for another additional chroma Intra mode using extended vertical neighboring pixels, where additional N pixels from the lower-left neighbor are used. While the method of Zhang demonstrates noticeable improvement in performance, the method also causes increases in computational complexity and buffer requirement.

It is desirable to develop improved method that may further improve the performance and/or reduce the buffer requirement of chroma Intra prediction.

SUMMARY

A method for cross-color Intra prediction based on reconstructed pixels of another color using a linear model (referred as LM mode or LM Intra mode) is disclosed. The method receives neighboring reconstructed first-color pixels and current reconstructed first-color pixels of a current first-color block and receives neighboring reconstructed second-color pixels of a current second-color block collocated with the current first-color block. The method then determines linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels. The method then receives input data associated with current second-color pixels of the current second-color block and generates a cross-color Intra predictor from the current reconstructed first-color pixels of the current first-color block using the LM parameters associated with a LM Intra mode selected from said one or more LM Intra modes. Finally, the method applies cross-color Intra prediction encoding or decoding to the current second-color pixels of the current second-color block using the cross-color Intra predictor for the selected LM Intra mode.

In another embodiment, an apparatus of cross-color Intra prediction based on reconstructed pixels of another color component, the apparatus comprising one or more circuits configured to: receive neighboring reconstructed first-color pixels and current reconstructed first-color pixels of a current first-color block; receive neighboring reconstructed second-color pixels of a current second-color block collocated with the current first-color block; determine linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels; receive input data associated with current second-color pixels of the current second-color block; generate a cross-color Intra predictor from the current reconstructed first-color pixels of the current first-color block using the LM parameters associated with a LM Intra mode selected from said one or more LM Intra modes; and apply cross-color Intra prediction encoding or decoding to the current second-color pixels of the current second-color block using the cross-color Intra predictor for the selected LM Intra mode.

The cross-color Intra mode according to the present invention may also be applied to a scalable coding system or multi-view coding system, where the current first-color block corresponds to a reconstructed block in a reference layer or a reference view and the current second-color block corresponds to a to-be-coded or decoded block in a dependent layer or a dependent view.

Yet another embodiment of the present invention is directed to a non-transitory computer readable medium storing a computer-executable program, the computer-executable program, when executed, causing a decoder to perform the following steps: receiving neighboring reconstructed first-color pixels and current reconstructed first-color pixels of a current first-color block; receiving neighboring reconstructed second-color pixels of a current second-color block collocated with the current first-color block; determining linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels; receiving input data associated with current second-color pixels of the current second-color block; generating a cross-color Intra predictor from the current reconstructed first-color pixels of the current first-color block using the LM parameters associated with a LM Intra mode selected from said one or more LM Intra modes; and applying cross-color Intra prediction encoding or decoding to the current second-color pixels of the current second-color block using the cross-color Intra predictor for the selected LM Intra mode.

DETAILED DESCRIPTION

Figure 1:
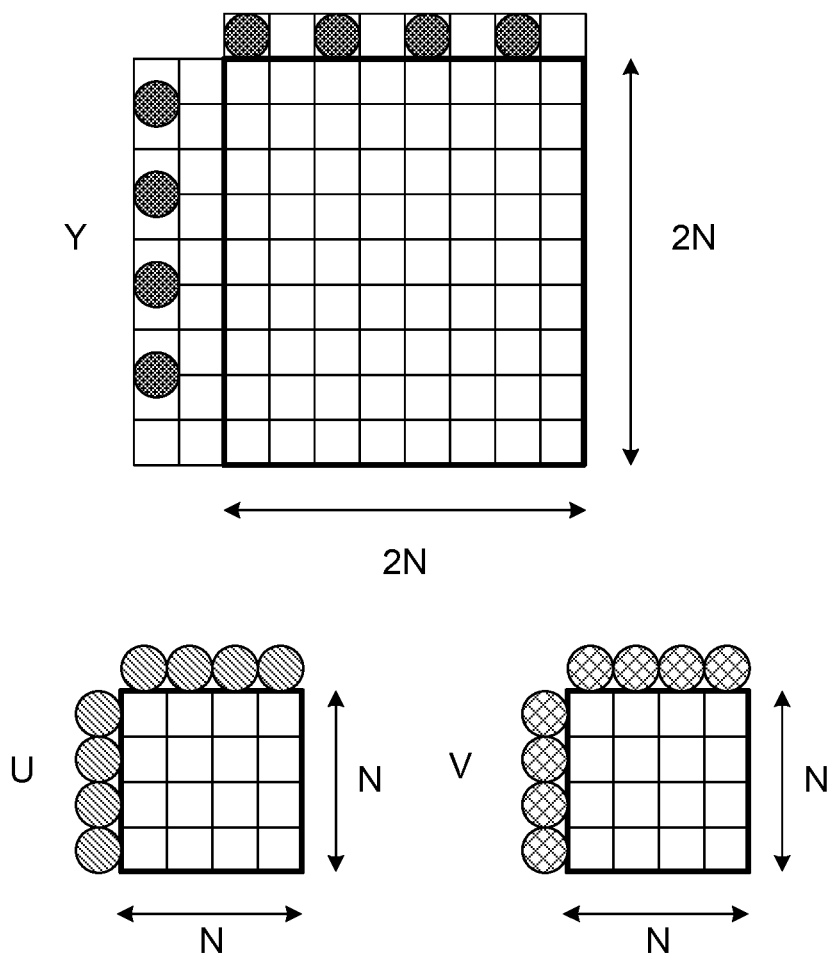
FIG. 1 illustrates an example of derivation of chroma Intra prediction for LM mode based on reconstructed luma pixels according to a conventional method for a 4:2:0 sampling format.
Figure 2A:
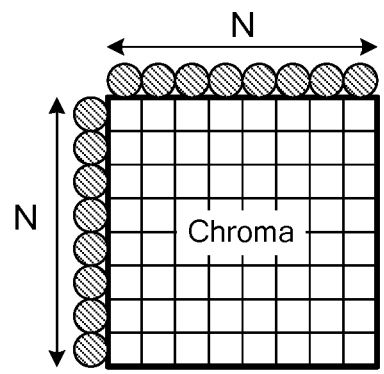
FIG. 2A-FIG. 2C illustrate an example of derivation of chroma Intra prediction based on reconstructed luma pixels according to Zhang et al. disclosed in JCTVC-G358.
Figure 2B:
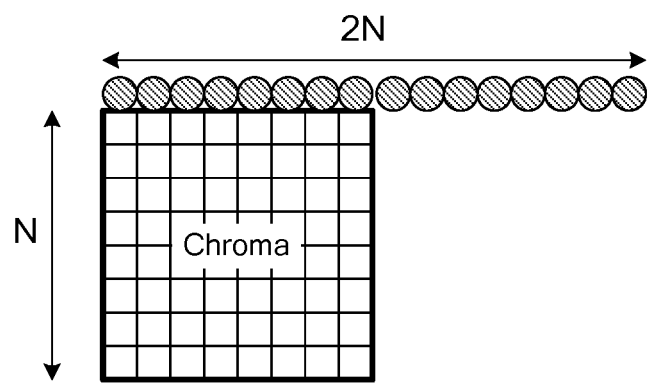
Figure 2C:
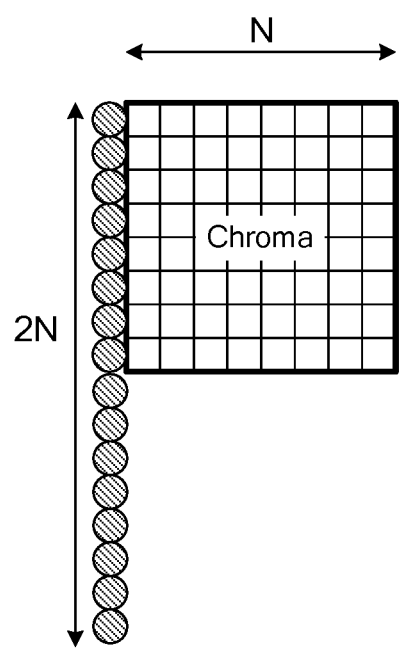
Figure 3A:
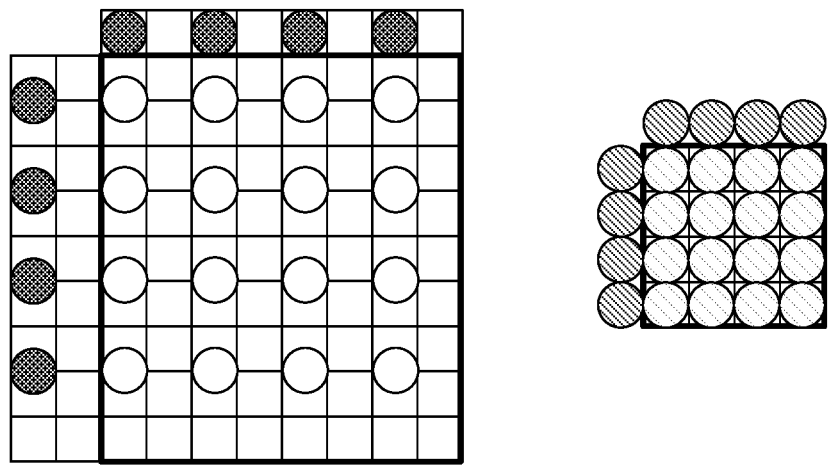
FIG. 3A-FIG. 3C illustrate an example of multi-LM chroma Intra modes according to an embodiment of the present invention for a 4:2:0 sampling format.
Figure 3B:
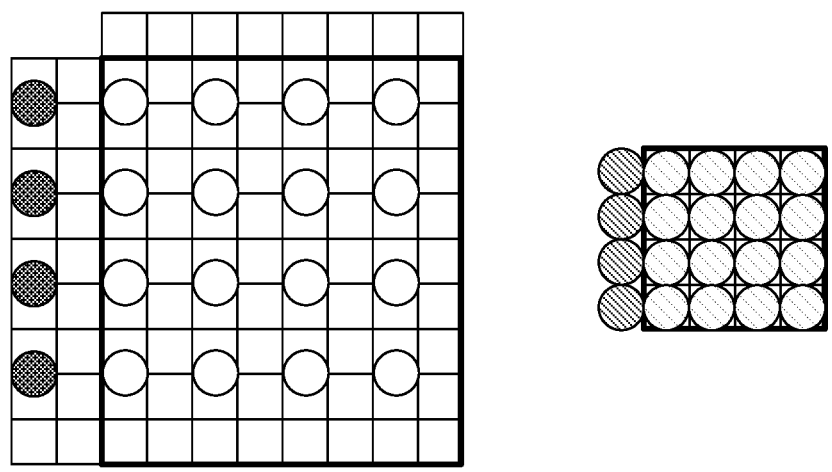
Figure 3C:
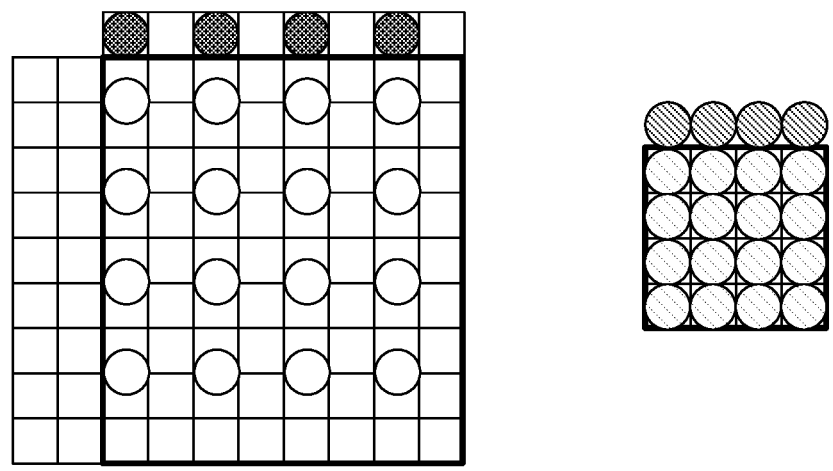

As mentioned before, in traditional LM chroma mode, both top and left neighboring samples are used to derive LM parameters, as shown in FIG. 1. The chroma Intra prediction with additional LM modes as shown in FIG. 2A-FIG. 2C improve the performance. However, the method using extended neighboring pixels causes higher computational complexity and/or more buffer requirement. In order to improve the coding performance without causing noticeable impact on the computational complexity and/or buffer requirement, embodiments of the present invention only use part of neighboring reconstructed samples in LM parameter derivation. For example, only left neighboring samples or only top neighboring samples are used to derive LM parameters in Left-Only or Top-Only LM chroma mode, as shown in FIG. 3B or FIG. 3C respectively in addition to the regular mode with Left and Top neighboring pixels as shown in FIG. 3A.

In Left-Only or Top-Only LM chroma mode, the number of samples used to derive LM parameters is only half of that for the regular chroma Intra prediction mode with both Left and Top neighboring pixels. While the method using Left-only or Top-only neighboring pixels can reduce the computational complexity of LM parameter derivation, the derived LM parameters may not be accurate enough. In a typical coding system, line buffers may already be used in the system for other purposes, such as deblocking filter. Another embodiment of the present invention re-uses the existing buffers for LM parameter derivation without the need for additional buffers. Re-using the line buffers in deblocking filter implies that more sample lines or columns may be used for LM parameter derivation. Consequently, more accurate LM parameters can be obtained while Left-only or Top-only neighboring pixels are used.

Figure 4A:
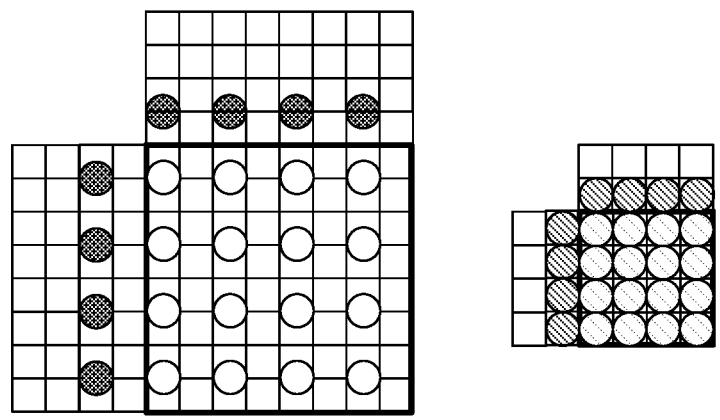
FIG. 4A-FIG. 4C illustrate an example of multi-LM chroma Intra modes with multi-rows or multi-columns of neighboring reconstructed pixels according to an embodiment of the present invention for a 4:2:0 sampling format.
Figure 4B:
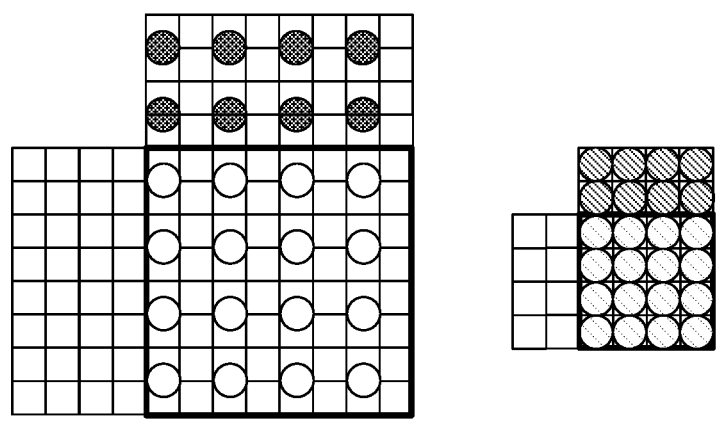
Figure 4C:
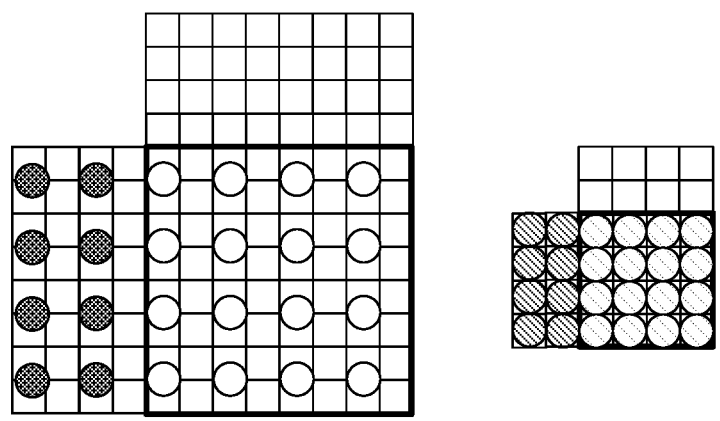

The deblocking filter for HEVC is applied to both horizontal and vertical block boundaries. For luma samples, the deblocking filter is operated on four samples on each side of a boundary. For chroma samples (YUV420 format assumed), the deblocking filter is operated on two samples on each side of a boundary. Therefore, four luma sample lines, four luma sample columns, two chroma sample lines, and two chroma sample columns may already be used in a HEVC system to implement deblocking. Therefore, these four luma sample lines, four luma sample columns, two chroma sample lines, and two chroma sample columns can be re-used in a HEVC system for chroma LM mode without increasing the buffer requirement. FIG. 4A-FIG. 4C illustrate an example to re-use the deblocking buffer to derive LM parameters for Multi-LM chroma modes with multiple rows or columns according to an embodiment of the present invention. For the regular LM chroma mode using both Left and Top neighboring samples, the LM parameters for the LM chroma mode is shown in FIG. 4A, for a YUV420 color system which is the same as the example in FIG. 1. For Left-Only or Top-Only LM chroma mode, two sample rows or two sample columns are used for LM parameter derivation, as shown in FIGS. 4B and 4C, respectively.

An example of syntax incorporating Multi-LM chroma modes is shown in Table 1. The existing HEVC syntax is modified to accommodate three LM chroma Intra modes for the chroma Intra prediction.

TABLE 1

| Codeword | Chroma Intra mode (Intra_chroma_pred_mode) |
|---|---|
| 0 | 4 |
| 100 | Left + Top LM chroma mode |
| 1010 | Top-Only LM chroma mode |
| 1011 | Left-Only LM chroma mode |
| 1100 | 0 |
| 1101 | 1 |
| 1110 | 2 |
| 1111 | 3 |

Another embodiment of the present invention uses distance-weighted LM chroma mode. The distance-weighted LM chroma mode blends two LM predictors with different weighting values according to the distances from the to-be-predicted chroma sample to the top and left block boundaries. The two LM predictors are derived from left reconstructed boundary pixels and top reconstructed boundary pixels respectively.

According to the distance-weighted LM chroma mode, two sets of LM parameters for the current to-be-predicted chroma block are derived first. The Left-only LM parameters $\{a_L, b_L\}$ are derived based on the neighboring boundary pixels as shown in FIG. 3B. The Top-only LM parameters $\{a_T, b_T\}$ are derived based on the neighboring boundary pixels as shown in FIG. 3C.

After the LM parameters are derived, the to-be-predicted chroma sample V is predicted by the collocated luma sample $V_{col}$ in the current block according to a linear model depending on the specific LM mode selected. If the Multi-LM mode selected corresponds to Left-only predictor ($P_L$) or Top-only predictor ($P_T$), the Multi-LM predictor is derived as follows:

$$\begin{cases} P_L = a_L \cdot V_{col}(x_c, y_c) + b_L, & \text{Left-only predictor,} \\ P_T = a_T \cdot V_{col}(x_c, y_c) + b_T & \text{Top-only predictor.} \end{cases}$$

In the above equations, ($x_c$, $y_c$) specifies the location of the to-be-predicted chroma sample relative to the top-left sample of the current chroma block. That is, $x_c$ and $y_c$ also indicate the distance to the left block boundary and the top block boundary, respectively. Therefore, the distance-weighted LM predictor can be derived as follows.

$$P = w \cdot P_L + (1-w) \cdot P_T.$$

In the above equation, w is a weighting factor depending on $x_c$ and $y_c$ and w has a value from 0 to 1. If the to-be-predicted chroma sample is closer to the left block boundary, w has a larger value. On the other hand, if the to-be-predicted chroma pixel is closer to the top block boundary, w has a smaller value. The closer boundary samples are regarded as more trusted samples to derive LM parameters. Two examples are provided as follows:

Example 1: Fine-Grained Weighted LM Predictor

In this example, each to-be-predicted sample has its own weighting value according to its location, $$w = \left(1 - \frac{x_c}{x_c + y_c}\right).$$

Example 2: Switched Weighted LM Predictor

Only two weighting values are used and the two values are switched by comparing the distance to the top block boundary and the distance to the left block boundary, $$w = \begin{cases} 0.75, & \text{if } x_c < y_c \\ 0.25, & \text{otherwise.} \end{cases}$$

In yet another embodiment of the present invention, the Multi-LM chroma mode uses multiple lines to increase LM parameter accuracy and uses distance-weighted LM chroma mode as well.

While the inter-color (also called cross-color) based linear mode is shown for chroma Intra prediction using reconstructed luma samples, the inter-color based linear model may also applied to other color systems. For example, the color components may correspond to Red (R), Green (G) and Blue (B).

The Intra prediction for one color component using a linear model based on another coded color component as disclosed above may be extended to scalable video coding or three-dimensional/multi-view coding. For example, a current block in a dependent view may be Intra predicted using linear model based on a reconstructed color component in a reference view. The reconstructed color component in the reference view may be the same color component as or different color component from the current block. For example, the reconstructed color component in the reference view may correspond to luminance while the current block may correspond to luminance or chrominance.

The performance of a system incorporating embodiments of the present invention is compared with a system based on HEVC Test Model version 10.0, where no LM chroma is used. A system incorporating a regular LM chroma mode is also included (indicated by LM in Table 2). The system incorporating embodiments of the present invention include the 3-LM chroma mode (indicated by "3-LM" in Table 2) and the 3-LM chroma mode combined with multi-rows and multi-columns (indicated by 3-LM with Multi-Rows/Columns in Table 2). A negative number means the percentage of bitrate saved compared to the anchor system based on HM10.0. The comparisons are performed using various coding configurations, where AI means all Intra coding, RA mean random access, LB means low delay B mode and LP means low delay P mode. As shown in Table 2, the system incorporating 3-LM chroma mode achieved further improvement over the regular LM mode. The 3-LM chroma mode with multi-rows and multi-columns achieves further improvement over the 3-LM chroma mode. The test video data used has a YUV420 format.

TABLE 2

| Class A and B | AI | | | RA | | | LB | | | LP | | |
| --- | --- | --- | --- | --- | --- | --- | --- | --- | --- | --- | --- | --- |
| | Y | U | V | Y | U | V | Y | U | V | Y | U | V |
| LM | −0.7 | −8.2 | −4.5 | −0.5 | −9.6 | −4.9 | −0.2 | −6.2 | −3.8 | −0.2 | −7.5 | −3.9 |
| 3-LM | −0.8 | −9.6 | −5.6 | −0.4 | −11.1 | −5.8 | −0.2 | −7.1 | −4.6 | −0.3 | −8.4 | −4.7 |
| 3-LM with Multi-Rows/ Columns | −0.8 | −10 | −6 | −0.5 | −12 | −6.4 | −0.2 | −7.8 | −4.8 | −0.4 | −9.2 | −5.1 |

Further comparison results are shown in Tables 3-5 for other video formats. The anchor system corresponds to a HEVC based system using regular chroma Intra prediction without the LM chroma Intra mode. Compared to the anchor system, the system incorporating multiple LM chroma modes according to embodiments of the present invention achieves 8.5%, 11.6%, 11.7% BD-rate reductions in AI-Main-tier, 6.9%, 8.3%, 9.4% BD-rate reductions in AI-High-tier, and 5.4%, 5.9%, 6.8% BD-rate reductions in AI-Super-High-tier respectively as shown in Table 3. When RGB444 format is used, the G component is treated as the luminance, and B and R are treated as chrominance components. Compared to the traditional LM chroma mode, the multi-LM chroma mode achieves additional 0.9% and 1.3% chroma BD-rate gains for AI-Main-tier, 0.6% and 1.0% chroma BD-rate gains for AI-High-tier, and 0.5% and 0.7% chroma BD-rate gains for AI-Super-High-tier. For all Intra coding configuration, the encoding time increases 21%. However, the decoding time is roughly unchanged as shown in Table 3.

TABLE 3

| | All Intra Main-tier | | | All Intra High-tier | | | All Intra Super-High-tier | | |
| --- | --- | --- | --- | --- | --- | --- | --- | --- | --- |
| | Y/G | U/B | V/R | Y/G | U/B | V/R | Y/G | U/B | V/R |
| RGB 4:4:4 | −20.0% | −18.6% | −19.6% | −15.7% | −15.0% | −15.8% | −11.8% | −11.3% | −12.0% |
| YCbCr 4:4:4 | −2.0% | −8.5% | −8.8% | −2.3% | −5.6% | −7.9% | −2.4% | −3.8% | −5.8% |
| YCbCr 4:2:2 | −1.8% | −6.5% | −5.5% | −1.5% | −3.4% | −3.4% | −1.1% | −1.9% | −1.9% |
| Overall | −8.5% | −11.6% | −11.7% | −6.9% | −8.3% | −9.4% | −5.4% | −5.9% | −6.8% |
| Enc Time [%] | | 121% | | | 121% | | | 121% | |
| Dec Time [%] | | 100% | | | 100% | | | 100% | |

The comparison results for Random Access Main-tier and Random Access High-tier are shown in Table 4. Compared to the anchor system, the system incorporating multiple LM chroma modes according to embodiments of the present invention achieves 4.7%, 8.9%, 8.6% BD-rate reductions in Random Access Main-tier, and 3.4%, 5.3%, 6.5% BD-rate reductions in Random Access High-tier. The encoding time only increases slightly while the decoding time is about the same.

TABLE 4

|  | Random Access Main-tier | | | Random Access High-tier | | |
|---|---|---|---|---|---|---|
|  | Y/G | U/B | V/R | Y/G | U/B | V/R |
| RGB 4:4:4 | −11.4% | −10.3% | −12.4% | −8.1% | −6.6% | −9.0% |
| YCbCr 4:4:4 | −0.9% | −8.6% | −7.5% | −0.9% | −5.9% | −6.6% |
| YCbCr 4:2:2 | −0.8% | −7.6% | −5.4% | −0.7% | −3.3% | −3.5% |
| Overall | −4.7% | −8.9% | −8.6% | −3.4% | −5.3% | −6.5% |
| Enc Time [%] |  | 102% |  |  | 103% |  |
| Dec Time [%] |  | 100% |  |  | 100% |  |

The comparison results for Low delay B Main-tier and Low delay B High-tier are shown in Table 5. Compared to the anchor system, the system incorporating multiple LM chroma modes according to embodiments of the present invention achieves 1.7%, 4.2%, 3.9% BD-rate reductions in Low delay B Main-tier, and 1.2%, 2.1%, 2.6% BD-rate reductions in Low delay B High-tier. The encoding time only increases slightly while the decoding time decreases 4%.

TABLE 5

|  | Low delay B Main-tier | | | Low delay B High-tier | | |
|---|---|---|---|---|---|---|
|  | Y/G | U/B | V/R | Y/G | U/B | V/R |
| RGB 4:4:4 | −4.3% | −3.8% | −4.7% | −3.0% | −2.1% | −3.2% |
| YCbCr 4:4:4 | −0.2% | −4.3% | −3.1% | −0.2% | −2.5% | −2.4% |
| YCbCr 4:2:2 | −0.3% | −4.6% | −3.7% | −0.3% | −1.7% | −2.2% |
| Overall | −1.7% | −4.2% | −3.9% | −1.2% | −2.1% | −2.6% |
| Enc Time [%] |  | 102% |  |  | 102% |  |
| Dec Time [%] |  | 96% |  |  | 96% |  |

Figure 5:
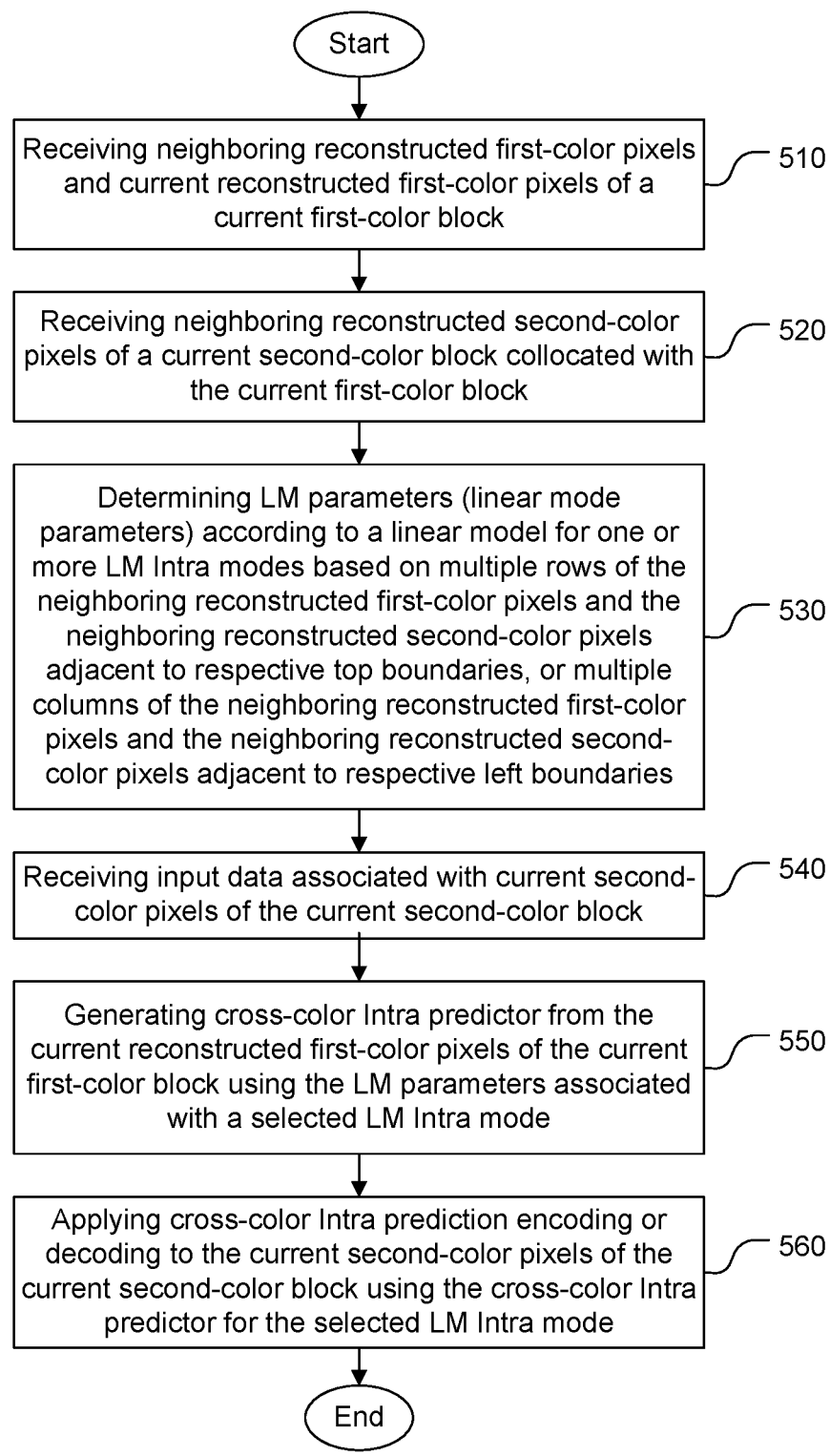
FIG. 5 illustrates an exemplary flowchart for LM chroma Intra prediction using multi-rows or multi-columns of neighboring reconstructed pixels for deriving the LM parameters according to an embodiment of the present invention.

FIG. 5 illustrates an exemplary flowchart for LM Intra mode using multi-rows or multi-columns of neighboring reconstructed pixels for deriving the LM parameters according to an embodiment of the present invention. Neighboring reconstructed first-color pixels and current reconstructed first-color pixels of a current first-color block are received from storage or a processor as shown in step 510. The first-color component corresponds to the color component that is processed before the second-color component. For example, the first-color component may correspond to the luminance component. For an encoder, the neighboring reconstructed first-color pixels and the current reconstructed first-color pixels of the current first-color block may be derived at the encoder. For example, a reconstruction loop in the encoder may be used to derive the neighboring reconstructed first-color pixels and current reconstructed first-color pixels of a current first-color block. For cross-color Intra prediction of a current second-color block, the neighboring reconstructed first-color pixels and the current reconstructed first-color pixels of the current first-color block have already been derived. The neighboring reconstructed second-color pixels of the current second-color block collocated with the current first-color block are received as shown in step 520. The LM parameters (linear mode parameters) according to a linear model are determined for one or more LM Intra modes based on multiple rows of the neighboring reconstructed first-color pixels and the neighboring reconstructed second-color pixels adjacent to respective top boundaries, or multiple columns of the neighboring reconstructed first-color pixels and the neighboring reconstructed second-color pixels adjacent to respective left boundaries as shown in step 530. Input data associated with the current second-color pixels of the current second-color block are received as shown in step 540. For encoding, the input data corresponds to second-color pixel data to be Intra coded. For decoding, the input data corresponds to coded second-color pixel data to be Intra decoded. Cross-color Intra predictor is generated from the current reconstructed first-color pixels of the current first-color block using the LM parameters associated with a selected LM Intra mode as shown in step 550. Cross-color Intra prediction encoding or decoding is then applied to the current second-color pixels of the current second-color block using the cross-color Intra predictor for the selected LM Intra mode as shown in step 560.

Figure 6:
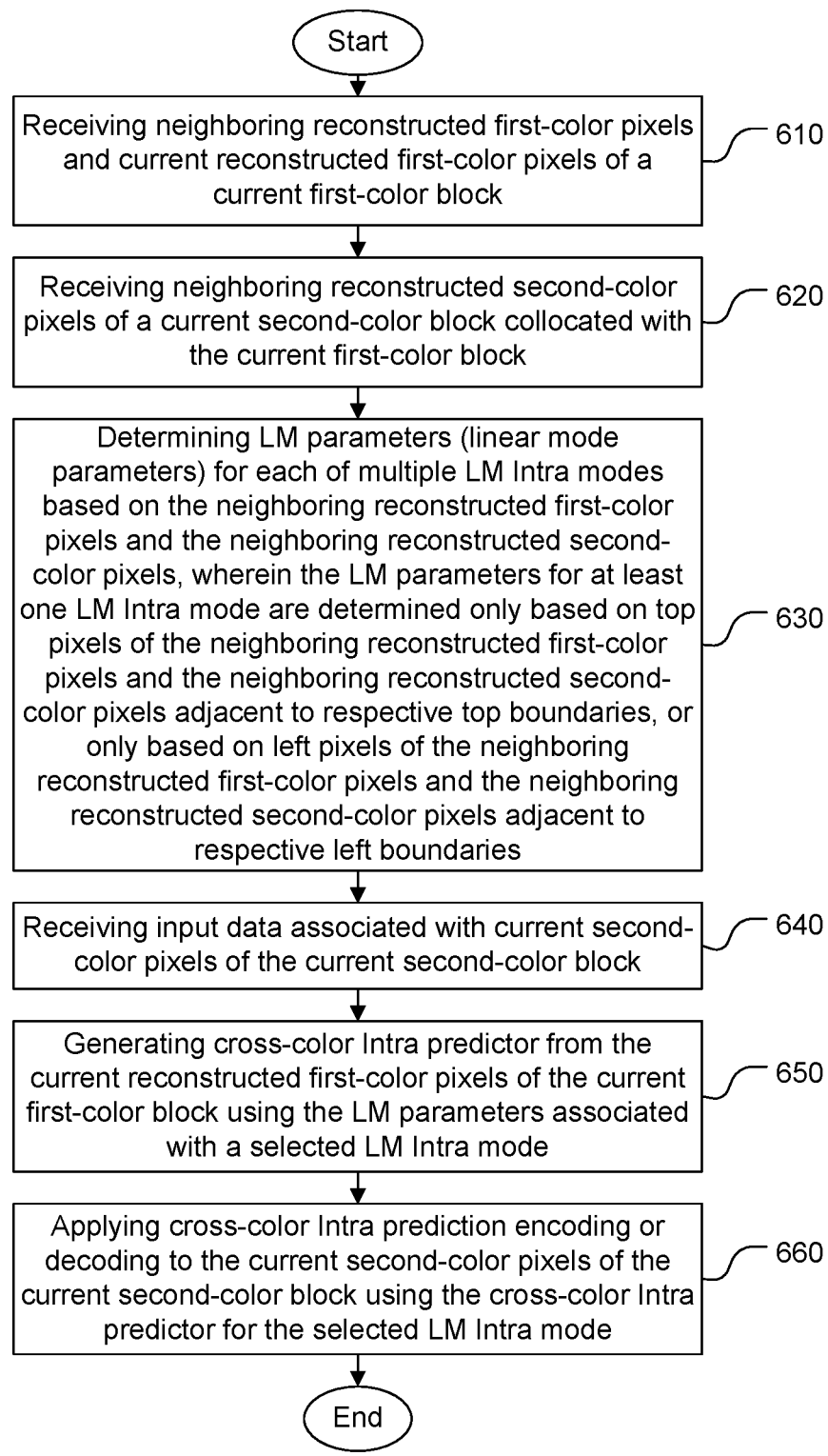
FIG. 6 illustrates an exemplary flowchart for LM chroma Intra prediction using only top pixels or only left pixels of neighboring reconstructed pixels for deriving the LM parameters according to an embodiment of the present invention.

FIG. 6 illustrates an exemplary flowchart for LM Intra mode using only top pixels or only left pixels of neighboring reconstructed pixels for deriving the LM parameters according to an embodiment of the present invention. Neighboring reconstructed first-color pixels and current reconstructed first-color pixels of a current first-color block are received from storage or a processor as shown in step 610. The neighboring reconstructed second-color pixels of the current second-color block collocated with the current first-color block are received as shown in step 620. The LM parameters for each of multiple LM Intra modes based on the neighboring reconstructed first-color pixels and the neighboring reconstructed second-color pixels are determined as shown in step 630, wherein the LM parameters for at least one LM Intra mode are determined only based on top pixels of the neighboring reconstructed first-color pixels and the neighboring reconstructed second-color pixels adjacent to respective top boundaries, or only based on left pixels of the neighboring reconstructed first-color pixels and the neighboring reconstructed second-color pixels adjacent to respective left boundaries. Input data associated with the current second-color pixels of the current second-color block are received as shown in step 640. Cross-color Intra predictor from the current reconstructed first-color pixels of the current first-color block are generated using the LM parameters associated with a selected LM Intra modes as shown in step 650. Cross-color Intra prediction encoding or decoding is then applied to the current second-color pixels of the current second-color block using the cross-color Intra predictor for the selected LM Intra mode as shown in step 660.

The flowcharts shown above are intended to illustrate examples of improved LM chroma mode for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of cross-color Intra prediction based on reconstructed pixels of another color component, the method comprising:

receiving neighboring reconstructed first-color pixels and current reconstructed first-color pixels of a current first-color block;

receiving neighboring reconstructed second-color pixels of a current second-color block collocated with the current first-color block;

determining linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels;

receiving input data associated with current second-color pixels of the current second-color block;

generating a cross-color Intra predictor from the current reconstructed first-color pixels of the current first-color block using the LM parameters associated with a LM Intra mode selected from said one or more LM Intra modes; and applying cross-color Intra prediction encoding or decoding to the current second-color pixels of the current second-color block using the cross-color Intra predictor for the selected LM Intra mode.

2. The method of claim 1, wherein the LM parameters for said at least one of said one or more LM Intra modes are determined only based on said multiple rows of the neighboring reconstructed second-color pixels adjacent to the top boundary of the current second-color block and said first part of the neighboring reconstructed first-color pixels, or only based on said multiple columns of the neighboring reconstructed second-color pixels adjacent to the left boundary of the current second-color block and said second part of the neighboring reconstructed first-color pixels.

3. The method of claim 2, wherein said multiple rows of the neighboring reconstructed second-color pixels comprise two rows of top pixels of the neighboring reconstructed second-color pixels adjacent to the top boundary of the current second-color block.

4. The method of claim 2, wherein said multiple columns of the neighboring reconstructed second-color pixels comprise two columns of left pixels of the neighboring reconstructed second-color pixels adjacent to the left boundary of the current second-color block.

5. The method of claim 1, wherein said one or more LM Intra modes correspond to three LM Intra modes, wherein the LM parameters for a first LM Intra mode are determined only based on said multiple rows of the neighboring reconstructed second-color pixels adjacent to the top boundary of the current second-color block and said first part of the neighboring reconstructed first-color pixels, wherein the LM parameters for a second LM Intra mode are determined only based on said multiple columns of the neighboring reconstructed second-color pixels adjacent to the left boundary of the current second-color block and said second part of the neighboring reconstructed first-color pixels, and wherein the LM parameters for a third LM Intra mode are determined based on a single row of the neighboring reconstructed second-color pixels adjacent to the top boundary of the current second-color block, a single column of the neighboring reconstructed second-color pixels adjacent to the left boundary of the current second-color block, and a third part of the neighboring reconstructed first-color pixels.

6. The method of claim 5, wherein said multiple rows of the neighboring reconstructed second-color pixels comprise two rows of top pixels of the neighboring reconstructed second-color pixels adjacent to the top boundary of the current second-color block, and the first part of the neighboring reconstructed first-color pixels comprises top pixels of the neighboring reconstructed first-color pixels near a top boundary of the current first-color block.

7. The method of claim 5, wherein said multiple columns of the neighboring reconstructed second-color pixels comprise two columns of left pixels of the neighboring reconstructed second-color pixels adjacent to the left boundary of the current second-color block, and the second part of the neighboring reconstructed first-color pixels comprises left pixels of the neighboring reconstructed first-color pixels near a left boundary of the current first-color block.

8. The method of claim 5, wherein said third part of the neighboring reconstructed first-color pixels comprises top pixels of the neighboring reconstructed first-color pixels near a top boundary of the current first-color block and left pixels of the neighboring reconstructed first-color pixels near a left boundary of the current first-color block.

9. The method of claim 5, wherein a syntax element is incorporated in a bitstream to indicate Intra prediction mode selected for the current second-color block, and wherein three different values are assigned to the Intra prediction mode to indicate the three LM Intra modes respectively.

10. The method of claim 1, wherein the first-color pixels correspond to luminance pixels or green pixels, and the second-color pixels correspond to chrominance pixels or blue/red pixels respectively.

11. The method of claim 1, further comprising retrieving the neighboring reconstructed first-color pixels and the neighboring reconstructed second-color pixels from a buffer associated with an in-loop filter for said determining LM parameters, wherein the buffer stores the neighboring reconstructed first-color pixels and the neighboring reconstructed second-color pixels previously used for the in-loop filter.

12. The method of claim 11, wherein said first part of the neighboring reconstructed first-color pixels and said multiple rows of the neighboring reconstructed second-color pixels are retrieved from the buffer, and the LM parameters are determined based on the retrieved first part of the neighboring reconstructed first-color pixels and the retrieved said multiple rows of the neighboring reconstructed second-color pixels adjacent to the respective top boundaries.

13. The method of claim 11, wherein said second part of the neighboring reconstructed first-color pixels and said multiple columns of the neighboring reconstructed second-color pixels are retrieved from the buffer, and the LM parameters are determined based on the retrieved second part of the neighboring reconstructed first-color pixels and the retrieved multiple columns of the neighboring reconstructed second-color pixels adjacent to the respective left boundaries.

14. The method of claim 11, wherein the in-loop filter comprises a deblocking filter.

15. The method of claim 1, wherein the current first-color block corresponds to a reconstructed block in a reference layer or a reference view, and the current second-color block corresponds to a to-be-coded or decoded block in a dependent layer or a dependent view in a scalable coding system or multi-view coding system respectively.

16. An apparatus of cross-color Intra prediction based on reconstructed pixels of another color component, the apparatus comprising one or more circuits configured to:
receive neighboring reconstructed first-color pixels and current reconstructed first-color pixels of a current first-color block;
receive neighboring reconstructed second-color pixels of a current second-color block collocated with the current first-color block;
determine linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels;
receive input data associated with current second-color pixels of the current second-color block;
generate a cross-color Intra predictor from the current reconstructed first-color pixels of the current first-color block using the LM parameters associated with a LM Intra mode selected from said one or more LM Intra modes; and
apply cross-color Intra prediction encoding or decoding to the current second-color pixels of the current second-color block using the cross-color Intra predictor for the selected LM Intra mode.

17. A non-transitory computer readable medium storing a computer-executable program, the computer-executable program, when executed, causing a decoder to perform the following steps:
receiving neighboring reconstructed first-color pixels and current reconstructed first-color pixels of a current first-color block;
receiving neighboring reconstructed second-color pixels of a current second-color block collocated with the current first-color block;
determining linear model (LM) parameters according to a linear model for one or more LM Intra modes, wherein the LM parameters for at least one of said one or more LM Intra modes is determined based on multiple rows of the neighboring reconstructed second-color pixels adjacent to a top boundary of the current second-color block and a first part of the neighboring reconstructed first-color pixels, or multiple columns of the neighboring reconstructed second-color pixels adjacent to a left boundary of the current second-color block and a second part of the neighboring reconstructed first-color pixels;
receiving input data associated with current second-color pixels of the current second-color block;
generating a cross-color Intra predictor from the current reconstructed first-color pixels of the current first-color block using the LM parameters associated with a LM Intra mode selected from said one or more LM Intra modes; and
applying cross-color Intra prediction encoding or decoding to the current second-color pixels of the current second-color block using the cross-color Intra predictor for the selected LM Intra mode.

* * * * *